United States Patent

Ogawa

Patent Number: 5,766,408
Date of Patent: Jun. 16, 1998

[54] TIRE BUILDING MACHINE INCLUDING INTEGRATED BEAD SETTER ON TRANSFER RING

[75] Inventor: Yuichiro Ogawa, Fuchu, Japan

[73] Assignee: Bridgestone Corporation, Tokyo, Japan

[21] Appl. No.: 659,434

[22] Filed: Jun. 6, 1996

[30] Foreign Application Priority Data

Jun. 6, 1995 [JP] Japan .................................. 7-139352

[51] Int. Cl.$^6$ ...................................................... B29D 30/26
[52] U.S. Cl. ........................ 156/396; 156/403; 156/406.2
[58] Field of Search ........................... 156/406.2, 396, 156/398, 403, 111, 126, 127

[56] References Cited

U.S. PATENT DOCUMENTS

| | | | |
|---|---|---|---|
| 2,814,330 | 11/1957 | Vanzo et al. | 156/403 |
| 3,784,437 | 1/1974 | Appleby et al. | 156/401 |
| 4,190,482 | 2/1980 | Yabe | 156/403 |
| 4,726,861 | 2/1988 | Vorih et al. | 156/406.2 |
| 5,051,149 | 9/1991 | Ishii | 156/406.2 |
| 5,186,778 | 2/1993 | Okafuji et al. | 156/396 |
| 5,322,587 | 6/1994 | Kondo et al. | 156/406.2 |
| 5,413,653 | 5/1995 | Kondo et al. | 156/406.2 |

FOREIGN PATENT DOCUMENTS

| | | | |
|---|---|---|---|
| 0 240 973 | 10/1987 | European Pat. Off. | |
| 0 510 192 A1 | 10/1992 | European Pat. Off. | |
| 2-165938 | 6/1990 | Japan . | |
| 852629 | 8/1981 | U.S.S.R. | 156/406.2 |
| 1052419 | 11/1983 | U.S.S.R. | 156/406.2 |
| 1113622 | 5/1968 | United Kingdom . | |

OTHER PUBLICATIONS

Patent Abstracts of Japan, 02165938 Dec. 21, 1988, Tire Molding Machine.

*Primary Examiner*—Geoffrey L. Knable
*Attorney, Agent, or Firm*—Sughrue, Mion, Zinn, Macpeak & Seas, PLLC

[57] ABSTRACT

A tire building machine includes a single-stage type forming drum (13) for initially forming a carcass band (29) and subsequently forming a green tire (34), and a belt-tread drum (14) for forming a belt-tread band (31). These drums (13, 14) are carried by a horizontal coaxial shaft (12) on a base member (10) of the machine. An integrated transfer unit (16) is movable in a predetermined transfer direction on the base member (10). The transfer unit (16) includes a bead setter (17) for setting beads (23) onto an outer circumference of a carcass band (29) formed on the forming drum (13), and a transfer ring (18) for transferring a belt-tread band (31) formed on the belt-tread drum (14) and a green tire (34) formed on the forming drum (13). The bead setter (17) and the transfer ring (18) are connected to each other as an integrated unit, and driven by a single drive means in the transfer direction.

7 Claims, 2 Drawing Sheets

FIG_1
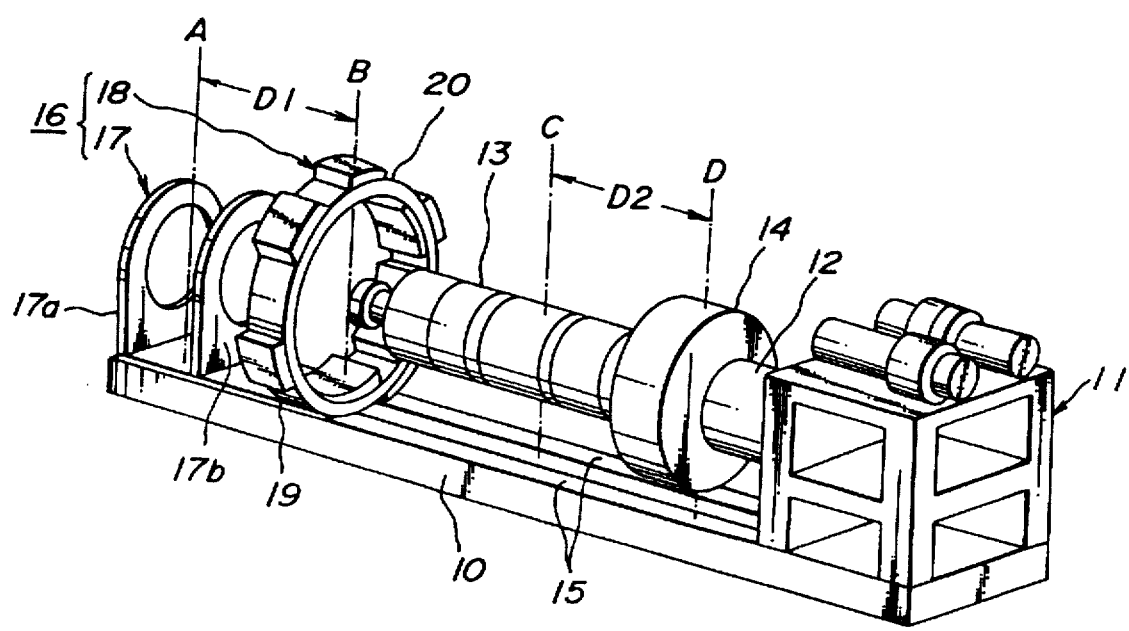

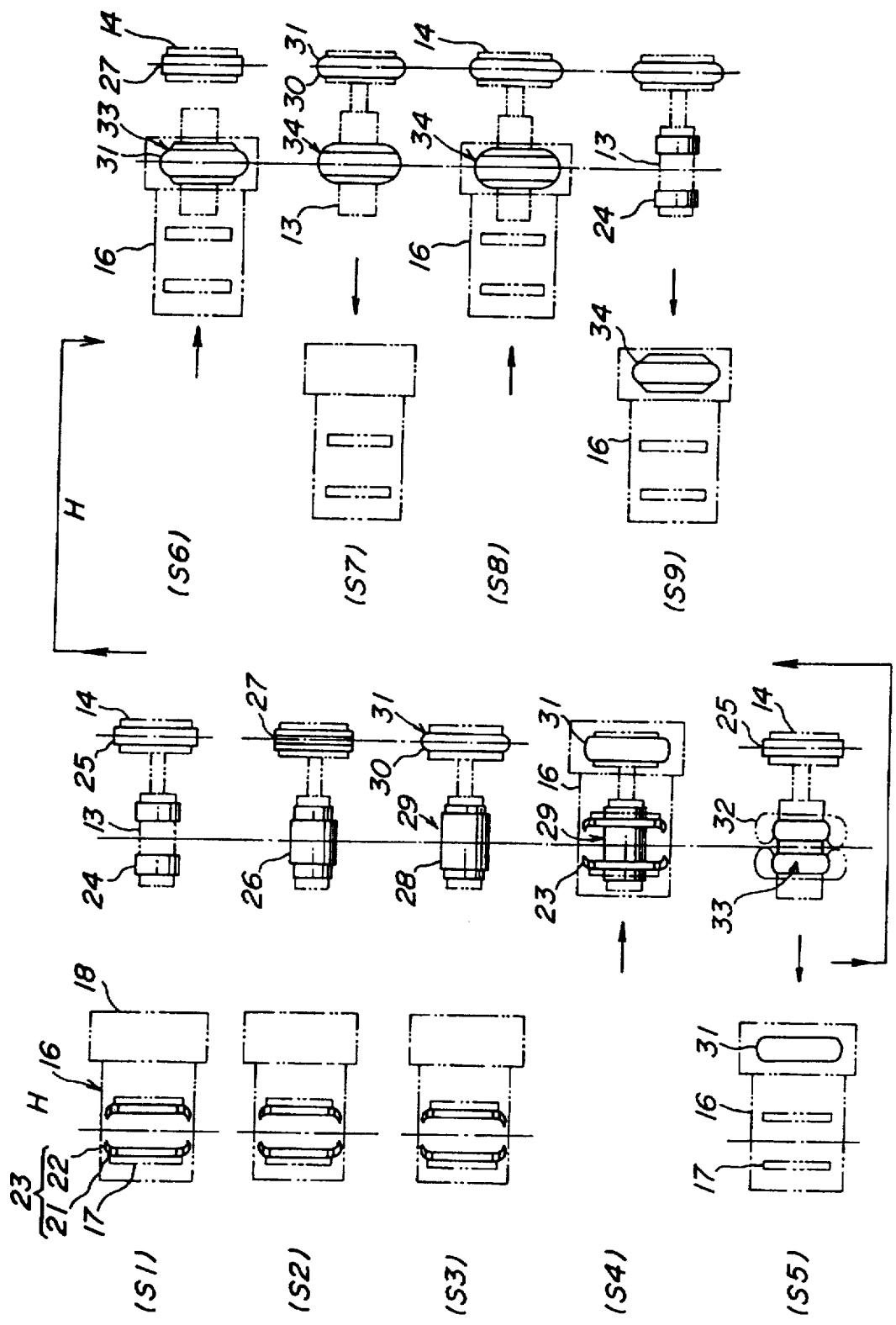

TIRE BUILDING MACHINE INCLUDING INTEGRATED BEAD SETTER ON TRANSFER RING

BACKGROUND OF THE INVENTION

1. Field of the Invention

The present invention relates to a tire building machine in which a single-stage forming drum and a belt-tread drum are arranged on a coaxial shaft in particular, this invention pertains to a transfer unit of a tire building machine which comprises a bead setter and a transfer ring.

2. Description of Related Art

A tire building machine including a single-stage forming drum and a belt-tread drum, which are arranged in-line on a horizontal coaxial shaft, is known and disclosed, e.g., in JP-A-2-165938. In this type of tire building machine, the single-stage forming drum serves to form a carcass band thereon, and subsequently a green tire by setting beads onto the outer circumference of the carcass band by means of a bead setter. A belt-tread band formed on the belt tread drum and the green tire formed on the forming drum are transferred by a transfer ring to a subsequent station. The bead setter and the transfer ring are associated with respective drive means, and are independently movable on a base member of the machine.

Such a tire building machine proved to achieve various advantages arising from use of a single-stage forming drum, such as reduction in the number of forming drums and associated movable parts. However, it is generally acknowledged in the art that this type of tire building machine involves a relatively complicated structure, lacks in reliability of operation, requires frequent maintenance of the movable parts, and is less economical in terms of initial and running costs. Consequently, there is a positive demand in the tire industry for a further improved tire building machine which is essentially free from these drawbacks while preserving the advantages of the single-stage forming drum.

DISCLOSURE OF THE INVENTION

It is a primary object of the present invention to provide a simple solution for the above-mentioned drawbacks.

In order to achieve the object, the inventors conducted thorough investigations and analysis and arrived at recognition that the above-mentioned drawbacks of known tire building machine resulted from individual construction of the bead setter and transfer ring, in combination with requirement for the respective drive means therefor.

Based on such recognition, the tire building machine according to the present invention comprises a base member, a horizontal coaxial shaft rotatably supported on the base member, and a set of drums each carried by the coaxial shaft. The drums are comprised of a single-stage type forming drum for initially forming a carcass band and subsequently forming a green tire, and a belt-tread drum for forming a belt-tread band.

According to the present invention, the tire building machine further comprises an integrated transfer unit adapted to be moved in a predetermined transfer direction on the base member, which is comprised of a bead setter for setting bead wires onto an outer circumference of a carcass band formed on the forming drum, and a transfer ring for transferring a belt-tread band formed on the belt-tread drum and a green tire formed on the forming drum. The bead setter and transfer ring are connected to each other as an integrated unit, and are driven by a single drive means so that they are moved relative to the base member in the transfer direction.

The tire building machine according to the present invention is featured by an arrangement wherein the bead setter and the transfer ring are integrally connected to each other and formed as an integrated unit. It is therefore possible to simplify the operations and improve the operational reliability of the movable parts. Moreover, an internal connection of the bead setter and the transfer ring makes it possible to drive these movable parts by a single drive means, to thereby facilitate maintenance of the drive means and reduce the initial and running cost of of the tire building machine as a whole.

Preferably, the tire building machine according to the present invention further comprises a machine frame arranged at one end portion of the base member, for rotatably supporting the coaxial shaft.

Advantageously, the transfer unit is arranged such that, as seen in the transfer direction, the bead setter and the transfer ring is spaced from each other by a first distance, and the forming drum and the belt-tread drum is spaced from each other by a second distance, wherein the first and second distances are substantially equal to each other.

Thus, when the bead setter is operated to set the beads onto the outer circumference of the carcass band on the forming drum, the transfer ring is capable of simultaneously engaging with the belt-tread band which has been formed on the belt tread drum.

BRIEF DESCRIPTION OF THE DRAWINGS

The present invention will be described below in further detail, with reference to a specific embodiment shown in the accompanying drawings, in which:

FIG. 1 is a perspective view showing a general arrangement of a tire building machine according to one embodiment of the present invention; and FIG. 2 is a schematic view explaining the operation of the machine in various steps showing an outline of a tire forming method according to the embodiment.

DESCRIPTION OF THE PREFERRED EMBODIMENT

Referring now to FIG. 1, there is shown an overall arrangement of a tire building machine according to the present invention.

The tire building machine illustrated in FIG. 1 comprises a base member 10 and a frame member 11 in the form of a stand which is fixedly secured to the upper surface of the base member 10 at its one end portion. A horizontal coaxial shaft 12 is rotatably supported by the frame member 11 and serves to carry a single-stage type forming drum 13 and a belt-tread drum 14.

The coaxial shaft 12 is comprised of an inner shaft portion and an outer, hollow shaft portion which are coaxially arranged relative to each other. The forming drum 13 may be secured to the inner shaft portion of the coaxial shaft 12, with the belt-tread drum 14 secured to the outer shaft portion of the coaxial shaft 12 and situated between the frame member 11 and the forming drum 13. The arrangement of such coaxial shaft is known, per se, so that the two shaft portions are not illustrated in the drawings.

The frame member 11 which supports the coaxial shaft 12 also accommodates therein a first driving device for rotating the forming drum 13 and adjusting the bead distance, i.e., the distance between right and left beads in the widthwise direction, as well as a second driving device for rotating the belt-tread drum 14 and causing radial expansion and contraction thereof. These driving devices can be individually operated to actuate the forming drum 13 and the belt-tread drum 14 independently of the other. Such driving devices are known, per se, so that further explanations will be omitted for the sake of simplicity.

A pair of guide rails 15 are provided on the upper surface of the base member 10 and arranged on right and left sides thereof in parallel with each other and also with the drum axis. There is provided a movable transfer unit 16 on the base member 10. The transfer unit 16 has a lower portion which is slidably engaged with the guide rails 15 so that the transfer unit 16 is adapted to travel along the guide rails 15.

The transfer unit 16 is composed of a bead setter 17 and a transfer ring 18 which are integrated into a single unit. The bead setter 17 includes a pair of holder stands 17a, 17b which are arranged on right and left sides in the width direction of a tire to be formed. As seen in the transfer direction, the widthwise center A of the bead setter 17 and the widthwise center B of the transfer ring 18 are spaced from each other by a first distance D1. Similarly, the the widthwise center C of forming drum 13 and the widthwise center D of the belt-tread drum 14 are spaced from each other by a second distance D2 which is substantially equal to the first distance D1.

The transfer unit 16 is capable of travelling along the guide rails 15 has various operational positions, including a waiting position illustrated in FIG. 1, a bead setting position where the center A of the bead setter 17 coincides with the center C of the forming drum 13 and the center B of the transfer ring 18 coincides with the center D of the belt-tread drum 14, as well as a belt-tread band setting position where the center B of the transfer ring 18 coincides with the center C of the forming drum 13. It is of course that the position where the transfer unit 16 grasps the completed green tire on the forming drum 13 is the same as the above-mentioned belt-tread band setting position.

A stitcher device having a plurality of stitcher rollers is disposed below the forming drum 13 at the corresponding position thereof. When a belt-tread band is set on the outer circumference of the green tire which is inflated and held on the forming drum 13, the stitcher rollers serve to urge the belt-tread band against the green case. Such a stitcher device is known, per se, and is thus omitted from the drawings.

The tire building machine further includes a first servicer for tire construction members to be supplied to the forming drum 13, such as side walls, inner liner, carcass plies, etc., as well as a second servicer for tire construction members to be supplied to the belt-tread drum 14, such as belt, tread, etc. The first and second servicers are arranged adjacent to the forming drum 13 and the belt-tread drum 14, respectively, on that side of the building machine which is opposite to the operator side. These servicers are known, per se, and are thus omitted from the drawings.

Further details of the above-mentioned elements of the tire building machine will be explained below with reference to FIGS. 1 and 2.

The side walls, inner liner, carcass plies and the like supplied from the first servicer are wound on the single-stage type forming drum 13 in laminated manner in order, to thereby form a carcass band. A pair of beads are transferred by the bead setter 17 to predetermined locations at the outer circumference of the carcass band. These beads are then expanded by bead locking portions of the forming drum 13 so as to be held in place from inside of the forming drum 13.

Subsequently, bladders 32 arranged on right and left sides of the forming drum 13 as a so-called double bladder assembly are inflated. By this, both end portions of the carcass band inclusive of the side walls, carcass plies, etc., are folded upward with the beads as the fulcrum along the entire circumference thereof, to thereby form a green tire.

Subsequently, a belt-tread band is transferred to the outer circumference of the green tire by the transfer ring 18. The widthwise distance between the right and left beads is then gradually reduced to a predetermined distance while an inner pressure is applied into the green tire to inflate it. As a result, the outer circumference of the green tire is urged against the inner circumference of the belt-tread band.

The transfer ring 18 is then moved to the waiting position where the stitcher rollers are urged against the forming drum 13 during rotation of the forming drum 13. As a result, the entire surface of the belt-tread band undergoes a tight pressure contact with the green case, thereby completing a green tire.

The belt-tread drum 14 is comprised of a cylindrical drum which can be radially expanded and contracted, and has an outer circumferential length which is substantially same as the inner circumferential length of the belt to be assembled when the drum is expanded. A plurality of belts are wound on the outer circumferential surface of the belt-tread drum 14 and laminated with each other. A tread comprised of unvulcanized rubber is then wound over the laminated belts, thereby forming a belt-tread band.

The bead setter 17 and the transfer ring 18 of the transfer unit 16 are fixedly connected to the upper surface of a common stand 19, thereby forming an integrated unit. The arrangement is such that the center axes of the bead setter 17 and transfer ring 18 coincide with the common axis of the forming drum 13 and the belt-tread drum 14.

The common stand 19 for the bead setter 17 and transfer ring 18 of the transfer unit 16 has slide bearings at lower surface thereof. These bearings are slidably engaged with the guide rails 15 on the upper surface of the base member 10. The stand 19 is connected to, and can be driven by an appropriate drive unit, such as a cylinder or motor (not shown). By driving the stand 19 along the guide rails 15, the transfer unit 16 can be moved to selected one of three positions including the waiting position, bead setting position and the belt-tread band setting position. In this connection, as described above, the distance D1 between the widthwise center A of the bead setter 17 and the widthwise center B is substantially equal to the distance D2 between the widthwise center C of the forming drum 13 and the widthwise center D of the belt-tread drum 14.

The bead setter 17 including holder stands 17a, 17b on right and left sides is arranged so that the distance between these stands 17a, 17b can be adjusted. The holder stands 17a, 17b are provided with respective bead holder rings, not shown, which can be radially expanded and contracted. Additionally, or alternatively, each bead holder stand may be provided with a plurality of magnets which are disposed on side surfaces of the bead holder rings over the entire circumference thereof. Thus, the magnets serve to attract side surfaces of the bead rings to thereby hold the bead. Such an arrangement of the bead setter 17 is known, per se, and a detailed illustration is thus omitted from the drawings.

The transfer ring 18 is divided in its circumferential direction into a plurality of arcuate segments 20 which can be radially expanded and contracted. These segments 20 are adapted to surround the belt-tread band formed on the belt-tread drum 14 or the green tire completed on the forming drum 13, and grasp and thereby hold the belt-tread band or the green tire over the entire outer surface from outside. Such an arrangement of the transfer ring 18 is known, per se, and a detailed illustration is thus omitted from the drawings.

A tire building method to be carried out with the above-mentioned building machine will be explained below with reference to FIG. 2. The method includes step 1 through step 9 which are sequentially performed one after the other. These steps are denoted in FIG. 2 by reference characters S1 through S9. It should be further noted that reference character H in FIG. 2 denotes the waiting position of the transfer unit 16.

Typically, a large-sized tire for heavy duty vehicles, such as buses and tracks, has at least four belt layers, while a small-sized tre for passenger cars has two belt layers. For purpose of simplicity, the following description will be made in connection with formation of a small-sized tire having two belt layers.

It should also be noted that, in actual tire forming process, various kinds of tire construction members are used including small articles. For the sake of simplicity, the following description refers only to major tire construction members.

The transfer unit 16 comprised of the bead setter 17 and transfer ring 18 is illustrated by imaginary lines and assumed to be positioned at the waiting position H.

At first step S1, a pair of beads 23 comprised of preset bead cores 21 and bead stiffeners 22 are held by a pair of holder rings of the bead setter 17. A pair of side walls 24 are wound on the outer circumferential surface of the forming drum 13 at both side portions thereof. Simultaneously, a first belt 25 is wound on the outer circumferential surface of the belt-tread drum 14 at its widthwise center region.

At second step S2, an inner liner 26 is wound on the outer circumferential surface of the forming drum 13 at its widthwise center region. Simultaneously, a second belt 27 is wound over the first belt 25 on the belt-tread drum 14.

At third step S3, carcass plies 28 are wound over the forming drum 13 and then stitched by the stitching device (not shown) to form a carcass band 29 which is comprised of the side walls 24, inner liner 26 and carcass plies 28. Simultaneously, a tread 30 is wound over the belt-tread drum 14 to form a belt-tread band 31 which is comprised of the first belt 25, second belt 27 and tread 30.

At fourth step S4, the transfer unit 16 is moved from the waiting position H to the bead setting position. The bead locking portions of the forming drum 13 are then radially expanded so that the beads 23 which had been held by the holder rings of the bead setter 17 are engaged from inside thereof. The beads 23 are set to predetermined locations at the outer circumference of the carcass band 29, thereby completing transfer of the beads 23.

Simultaneously, on the side of the belt-tread drum 14, the arcuate segments of the transfer ring 18 are radially contracted to have a reduced diameter to be engaged with the belt-tread band 31 from outside, while the belt-tread drum 14 is radially contracted to have a reduced diameter to be disengaged from the belt-tread band 31, thereby completing transfer of the belt-tread band 31.

At fifth step S5, the transfer unit 16 holding the belt-tread band 31 is moved to the waiting position H and the bladders 32 at right and left end portions of the forming drum 13 are inflated. As a result, the side walls 24, carcass plies 28 and the like at the both end portions of the carcass band 29,are folded upwards with the beads 23 as the fulcrum, over the entire circumference thereof, to thereby form a green case 33.

Moreover, after the belt-tread band 31 is taken out from the belt-tread drum 14, the belt-tread drum 14 is radially expanded to have an increased diameter, a new first belt 25 for forming a next tire is wound on the belt-tread drum 14.

At sixth step S6, the transfer unit 16 holding the belt-tread band 31 is moved from the waiting position H to the belt-tread band setting position.

In connection with the single-stage type forming drum 13, the widthwise distance between the right and left beads is gradually decreased to a predetermined distance while an inner pressure is applied to the green case 33. As a result, the outer circumferential surface of the green case 33 and the inner circumferential surface of the belt-tread band 31 are pressure-contacted to each other. On this occasion, the arcuate segments of the transfer ring 18 are radially expanded to have an increased diameter to be disengaged from the belt-tread band 31 to thereby complete transfer of the belt-tread band 31.

Simultaneously, in connection with the belt-tread drum 14, the second belt 27 is wound on an upper face of the first belt 25.

At seventh step S7, the transfer unit 16 is moved to the waiting position H, and the stitcher rollers of the stitcher device are urged against the forming drum 13 under rotation. As a result, the entire surface of the belt-tread band 31 tightly contacts the green case 33, thereby completing a green tire 34.

Simultaneously, the tread 30 is wound over the belt-tread drum 14 to form a new belt-tread band 31 for a next tire, which is comprised of a new set of first belt 25, second belt 27 and tread 30.

At eighth step S8, the transfer unit 16 is moved from the waiting position H to the green tire holding position which corresponds to the belt tread band setting position. The green tire 34 is then engaged by the transfer unit 16 from outside while the bead locking portions of the forming drum 13 are radially contracted to have a reduced diameter so as to be disengaged from the green tire 34.

On such occasion, the belt-tread drum 14 has already finished formation of a new belt-tread band for a next tire, and is maintained in the waiting condition. This is due to the difference in number of operational steps for the forming drum 13 and belt-tread drum 14.

At ninth step S9, the transfer unit 16 is returned to the waiting position H, then releases the green tire 34 which had been held by the transfer unit 16, to transfer the green tire to a next station. Then, the transfer unit 16 repeats a new series of steps, beginning from the above-mentioned first step S1.

As for the forming drum 13, the right and left bead locking portions are moved to predetermined positions so that their distance is increased. The right and left side walls 24 for a next tire are wound on the forming drum 13, and a new series of steps beginning from the first step S1 is repeated. As for the belt-tread drum 14, on the other hand, a new series of steps from the fourth step S4 to the ninth step S9 is repeated.

As described above with reference to the illustrated embodiment, the present invention is featured by an arrangement wherein the bead setter 17 and the transfer ring 18 are integrally connected to each other and formed as an integrated unit. It is therefore possible to simplify the operations and improve the operational reliability of the movable parts. Moreover, an internal connection of the bead setter 17 and the transfer ring 18 makes it possible to drive these movable parts by a single drive means, to thereby facilitate maintenance of the drive means and reduce the initial and running cost of of the tire building machine as a whole.

While the present invention has been described above with reference to a specific embodiment, it is of course that various modifications and/or alterations may be made without departing from the scope of the invention as defined by the appended claims.

I claim:

1. A tire building machine comprising:

a base member;

a horizontal coaxial shaft rotatably supported on the base member;

a set of drums each carried by said coaxial shaft, said set of drums comprising a single-stage forming drum for initially forming a carcass band and subsequently forming a green tire, and a belt-tread drum for forming a belt-tread band;

an integrated transfer unit adapted to be moved in a predetermined transfer direction on said base member, said integrated transfer unit comprising a bead setter for setting a pair of beads onto an outer circumference of a carcass band formed on said forming drum, and a transfer ring for transferring a belt-tread band formed on said belt-tread drum and a green tire formed on said forming drum, said bead setter and said transfer ring being connected to each other and aligned along the axis of said coaxial shaft as an integrated unit; and a single drive mechanism for driving the bead setter and the transfer ring of the integrated transfer unit together in said transfer direction.

2. The tire building machine according to claim 1, wherein said transfer unit is arranged such that, in said transfer direction, the bead setter and the transfer ring an spaced from each other by a first distance, and the forming drum and the belt-tread drum are spaced from each other by a second distance, said first and second distances being substantially equal to each other.

3. The tire building machine according to claim 1, further comprising a machine frame arranged at one end portion of the base member, for rotatably supporting the coaxial shaft.

4. The tire building machine according to claim 3 wherein said machine frame includes a guide rail and said integrated transfer unit is guided on said rail.

5. The tire building machine of claim 1 wherein said transfer ring comprises a series of arcuate segments.

6. The tire building machine of claim 1 further comprising a stand for mounting said transfer ring and said bead setter together.

7. The tire building machine according to claim 1 wherein said integrated transfer unit is positioned such that said bead setter is in engagement with said single-stage forming drum, when said transfer ring is positioned to engage said belt-tread drum.

* * * * *